US012706532B2

(12) United States Patent
Melkonyan et al.

(10) Patent No.: US 12,706,532 B2
(45) Date of Patent: Aug. 11, 2026

(54) RESONANT DC CONVERTER AND METHOD FOR OPERATING A RESONANT DC CONVERTER

(71) Applicant: Siemens Aktiengesellschaft, Munich (DE)

(72) Inventors: Ashot Melkonyan, Munich (DE); Hans-Christian Doht, Erlangen (DE); Jörg Leonhardt, Bruchsal (DE); Sebastian Nielebock, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 173 days.

(21) Appl. No.: 18/820,702

(22) Filed: Aug. 30, 2024

(65) Prior Publication Data

US 2025/0079980 A1 Mar. 6, 2025

(30) Foreign Application Priority Data

Aug. 30, 2023 (DE) .................... 10 2023 208 316.7

(51) Int. Cl.
*H02M 3/00* (2006.01)
*H02M 1/00* (2006.01)
(Continued)

(52) U.S. Cl.
CPC ......... *H02M 3/015* (2021.05); *H02M 1/0054* (2021.05); *H02M 3/33571* (2021.05); *H02M 7/217* (2013.01)

(58) Field of Classification Search
CPC ............... H02M 3/015; H02M 1/0054; H02M 3/33571; H02M 7/217
See application file for complete search history.

(56) References Cited

U.S. PATENT DOCUMENTS 7,184,280 B2 * 2/2007 Sun ..................... H02M 3/3376 363/21.02
9,167,675 B2 * 10/2015 Ortiz-Gavin ........... H05B 41/30
(Continued)

FOREIGN PATENT DOCUMENTS

DE 102009024224 A1 4/2010
DE 102005050842 B4 6/2011
(Continued)

OTHER PUBLICATIONS

Cha et al., A new three-phase interleaved isolated boost converter with active clamp for fuel cells, IEEE Power Electronics Specialists Conference, Jun. 2008, pp. 1271-1276, Rhodes, Greece.
(Continued)

*Primary Examiner* — Adolf D Berhane
(74) *Attorney, Agent, or Firm* — Laurence A. Greenberg; Werner H. Stemer; Ralph E. Locher

(57) ABSTRACT

A resonant DC converter is equipped with a supply input for a supply voltage, a DC voltage output for providing a DC voltage, a pulse generator connected to the supply input, a resonant converter connected to outputs of the pulse generator and on the output side to the DC voltage output, a capacitor connected between positive and negative poles of the DC voltage output, and a controller. The pulse generator generates pulses at a pulse frequency specified by the controller and to output them to the resonant converter. The resonant converter has a plurality N of resonant tanks having a resonant frequency. The controller is configured to specify a first pulse frequency to the pulse generator during an initialization time period of the DC converter and to specify a second pulse frequency different from the first pulse frequency to the pulse generator during a continuous operation time period.

15 Claims, 4 Drawing Sheets

(51) Int. Cl.
*H02M 3/335* (2006.01)
*H02M 7/217* (2006.01)

(56) References Cited

U.S. PATENT DOCUMENTS

| | | | | |
|---|---|---|---|---|
| 2019/0363661 | A1 | 11/2019 | Tapadia et al. | |
| 2021/0126550 | A1 | 4/2021 | Yenduri et al. | |
| 2024/0048061 | A1 * | 2/2024 | Sasmal ............. | H02M 3/33573 |

FOREIGN PATENT DOCUMENTS

| | | | |
|---|---|---|---|
| DE | 102021208278 | A1 | 2/2023 |
| WO | WO 2023006949 | A1 | 2/2023 |

OTHER PUBLICATIONS

Shukla et al., Pulse Splitting cum width control for transient handling of LLC Resonant Converter, IEEE Global Conference on Computing, Power and Communication Technologies (GlobConPT); Sep. 2022, pp. 1-5, New Delhi, India.

Rizzoli et al., Voltage Feedback of an LLC Resonant Converter with a Rotary Transformer; IECON 44th Annual Conference of the IEEE Industrial Electronics Society, Oct. 2018, pp. 1568-1573, Washington, DC, USA.

Khaligh et al., Comprehensive Topological Analysis of Conductive and Inductive Charging Solutions for Plug-In Electric Vehicles, IEEE Transactions on Vehicular Technology, Oct. 2012, pp. 3475-3489, vol. 61, issue 8, ISSN print: 0018-9545, ISSN electronic 1939-9359, Publ. IEEE.

* cited by examiner 1
2
3
Pulse Generator
4
Resonant Converter
5
6
7
8
Control Unit
9

7
8
14
Rectifier
Transformer
11
13-1
13-2
13-3
13-N
12-1
12-2
12-3
12-N
Distribution Stage
Resonant Tanks
10-1
10-2
10-3
10-N
18

Control Unit
1
9
3
4
5
7
8
10
11
12
13
14
15
16
16
16
18

RESONANT DC CONVERTER AND METHOD FOR OPERATING A RESONANT DC CONVERTER

CROSS-REFERENCE TO RELATED APPLICATION

This application claims the priority, under 35 U.S.C. § 119, of German Patent Application DE 10 2023 208 316.7, filed Aug. 30, 2023; the prior application is herewith incorporated by reference in its entirety.

FIELD AND BACKGROUND OF THE INVENTION

The invention relates to a resonant DC converter and to a method for operating a resonant DC converter.

DC converters are used to generate an adjustable DC voltage from a supply voltage. An AC or DC voltage can similarly be used as the supply voltage, wherein reference is often made to an AC/DC converter in the first case and to a DC/DC converter in the second case.

In general, the aim is to achieve the highest possible efficiency and/or the lowest possible losses during conversion. A DC converter can be used, for example, to charge a battery, wherein the DC voltage generated by the DC converter is adapted to a respective charge level of the battery and thus to an open-circuit voltage of the battery that varies with the charge level. Electrical isolation is also required for charging traction batteries of electric vehicles, with the result that resonant DC converters with a high-frequency transformer lend themselves as a known class of DC converters for such intended purposes. If the property of electrical isolation is intended to be identified, the designations explained above are written in slightly modified form as AC//DC or DC//DC converters. The DC converters described below can be operated equally from an AC or DC voltage as the supply voltage.

The core of a resonant DC converter is a resonant converter which has, on the input side, at least one resonant tank which can be excited by current or voltage pulses to oscillate at a resonant frequency. The resonant frequency results from the dimensioning of the circuit and its parasitic capacitances and inductances. The oscillation generated by the resonant tank is transmitted, via a primary winding of a high-frequency transformer, to its secondary side, where the transmitted energy is rectified and buffered in an output capacitor. The voltage across the output capacitor then represents the DC voltage generated by the DC converter. In general, series and parallel circuits containing capacitors that are used as a buffer capacitor at the output of a DC converter should also be understood as meaning an "output capacitor" (singular) in this document, even though a plurality of capacitors are involved in such cases.

When switching on resonant DC converters, no energy is stored in the DC converter or, more precisely, in the inductors (resonant tank, transformer, network filter) and capacitors (resonant tank, output capacitor) installed therein. This results in high inrush currents which can lead to destruction of the semiconductor components used. Parasitic inductances also cause oscillation in the DC converter, which can cause high reverse voltages at some of the transistors installed in the DC converter, which can be twice the voltages that occur during continuous operation and more. Accordingly, it is necessary to select transistors with sufficiently high breakdown voltages, which entails higher costs and higher power losses when controlling the transistors. Likewise, all other components must have a correspondingly higher dielectric strength.

SUMMARY OF THE INVENTION

A first aspect of the invention therefore introduces a DC converter having a supply input for a supply voltage, a DC voltage output for providing a DC voltage, a pulse generator connected on the input side to the supply input, a resonant converter connected on the input side to outputs of the pulse generator and on the output side to the DC voltage output, an output capacitor connected between a positive pole of the DC voltage output and a negative pole of the DC voltage output, and a control unit. The pulse generator is configured to generate pulses at a pulse frequency that can be variably specified by the control unit and to output them to the resonant converter. The resonant converter has a plurality N of resonant tanks having a resonant frequency. According to the invention, the control unit is configured to specify a first pulse frequency to the pulse generator during an initialization time period of the DC converter and to specify a second pulse frequency different from the first pulse frequency to the pulse generator during a continuous operation time period of the DC converter that follows the initialization time period. The second pulse frequency corresponds to N times the resonant frequency.

The invention is based on and includes the insight that a resonant converter has good efficiency only when operated at the resonant frequency of the resonant tanks. However, if the resonant converter is excited with pulses of a pulse frequency that deviates from the resonant frequency, the efficiency decreases sharply. The inventors have recognized that the reduced efficiency means increasing power loss within the DC converter, which generally must be absolutely avoided in the technical field. In contrast, however, the inventors have recognized that the input impedance of the DC converter is increased by changing the pulse frequency away from the resonant frequency of the resonant converter, with the result that exceeding of the nominal operating current intensity when switching on the DC converter can be avoided or at least greatly reduced. Accordingly, the invention provides for the resonant converter to be excited at a pulse frequency different from its resonant frequency in the initialization time period. The currents flowing into the resonant converter and the output capacitor can thus be restricted to variables customary in continuous operation, as a result of which the invention not only enables stable operation of the DC converter in a simple manner after being switched on, but also avoids additional costs for transistors with a higher current carrying capacity.

Particularly preferably, the first pulse frequency is greater than the second pulse frequency. Although the operation of the resonant converter below its resonant frequency also results in an increased impedance and thus the desired limitation of the inrush currents, increased pulse frequencies are preferred during the initialization time period, since they result in shorter switch-on phases of the transistors, which limits the thermal load on the transistors.

Preferably, the first pulse frequency and the second pulse frequency differ by at least 30 percent from each other; for example, one pulse frequency can be at least one and a half times, at least twice or even at least three times the other pulse frequency. The effect of the limitation becomes ever greater, the further away from the second pulse frequency the first pulse frequency is. However, the initialization time period should be short, because, during operation of the resonant converter away from its resonant frequency, increased power loss occurs in its switching elements and the switching elements may otherwise overheat. For this reason, the inrush currents that charge the various inductances and capacitances in the circuit should not be too limited either, since this would unnecessarily extend the initialization time period. In the best case, the inrush currents and reverse voltages at non-conductive transistors are approximately as high as the currents and voltages occurring at a corresponding point during continuous operation.

For example, the resonant frequency can be between 20 and 70 kilohertz. In this frequency range, resonant converters show good efficiencies with simultaneously reasonable costs for the semiconductor components used and the high-frequency transformer.

Preferably, the initialization time period lasts for less than 120 microseconds. Alternatively or additionally, the initialization time period preferably lasts for at least 30 microseconds. During such a time period, the inductances and capacitances of the DC converter can be sufficiently charged without allowing the inrush currents and reverse voltages to become too large. However, the initialization time period should not become too long either, since otherwise the thermal load on the transistors that are not current-free or voltage-free during the initialization time period will become too large (also see above).

The control unit may also be configured to specify a time-varying third pulse frequency during a transition time period between the initialization time period and the continuous operation time period, which third pulse frequency corresponds to the first pulse frequency at the beginning of the transition time period and to the second pulse frequency at the end of the transition time period, and to reduce a difference frequency between the third pulse frequency and the second pulse frequency over the transition time period. In particular, the difference frequency can be reduced continuously or gradually. An improved behavior with regard to control aspects of the circuit as well as with regard to the electromagnetic radiation and retroactive effect can result by virtue of the fact that the pulse frequency is not switched directly from the first to the second pulse frequency between the initialization time period and the continuous operation time period.

In preferred embodiments of the DC converter according to the invention, the pulse generator has SiC MOSFET transistors (silicon carbide metal oxide semiconductor field effect transistors) or GaN transistors (gallium nitride transistors). The pulse generator must meet the highest requirements in terms of switching frequency and edge steepness of the switched pulses, with the result that the best results are achieved with SiC MOSFETs or GaN transistors.

The resonant converter, on the other hand, can use more cost-effective IGBTs (Insulated Gate Bipolar Transistors) because the pulses generated by the pulse generator are distributed to the parallel paths of the resonant converter due to the design of the resonant converter with N resonant tanks, with the result that the switching elements used here are operated at the resonant frequency or near the resonant frequency, which means lower demands on the switching speed by a factor of N.

The compromise between fast, but cost-intensive transistors (SiC MOSFETs or GaN transistors) in the pulse generator on the one hand and low-cost, but slow IGBTs in the resonant converter on the other hand is therefore particularly advantageous. Here, it is advantageous if the control unit is additionally configured to switch the transistors of the resonant converter, since this makes it possible to achieve the situation in which the switching elements of the pulse generator and resonant converter are switched in sync with each other. This makes it possible to switch the switching elements of the resonant converter at times at which they are at least approximately current-free and/or voltage-free, which reduces the power loss occurring in the switching elements and thus causes better efficiency of the apparatus.

The pulse generator is particularly preferably designed to be without an intermediate circuit, i.e. without an intermediate circuit capacitor. Examples of such circuits can be found in the international patent application WO 2023/006949 A1. The invention is particularly suitable for circuits of this type, since the challenge of reliably changing from the switch-on state to stable continuous operation is particularly great due to the absence of the intermediate circuit capacitor, which represents a relatively high inertia and thus attenuation in terms of control.

Particularly preferably, the resonant converter has an N-phase high-frequency transformer having N primary windings which are each connected to a respective one of the N resonant tanks. The more phases the high-frequency transformer has, the smaller the currents on each of the N paths become, resulting in lower resistive losses. However, with an increasing number of phases, the structure of the high-frequency transformer becomes more complex and stray inductances increase, with the result that in practice high-frequency transformers with two, three or four phases show the best results.

A second aspect of the invention relates to a method for operating a DC converter having a supply input for a supply voltage, a DC voltage output for providing a DC voltage, a pulse generator connected on the input side to the supply input, a resonant converter connected on the input side to outputs of the pulse generator and on the output side to the DC voltage output, and an output capacitor connected between a positive pole of the DC voltage output and a negative pole of the DC voltage output. The pulse generator is configured to generate pulses at a variable pulse frequency and to output them to the resonant converter, wherein the resonant converter has a plurality N of resonant tanks having a resonant frequency. According to the invention, the pulse generator generates pulses at a first pulse frequency during an initialization time period of the DC converter and generates pulses at a second pulse frequency different from the first pulse frequency during a continuous operation time period of the DC converter that follows the initialization time period. The second pulse frequency corresponds to N times the resonant frequency.

The method of the second aspect of the invention makes it possible to activate a DC converter of the type described here without allowing the inrush currents occurring in this case to become too large. This in turn makes it possible to use low-cost transistors with a lower current carrying capacity. In addition, the load on all voltage-loaded components is relieved, with the result that more cost-effective designs are selected and/or life-time advantages can be expected.

Particularly preferably, the first pulse frequency is greater than the second pulse frequency, which entails the advantages described above for the apparatus.

Preferably, the first pulse frequency and the second pulse frequency differ by at least 30 percent from each other; for example, one pulse frequency can be at least one and a half times, twice or even three times the other pulse frequency. As regards the advantages achieved by this, reference should be made again to the statements made with respect to the apparatus according to the invention.

The pulse generator can generate pulses at a time-varying third pulse frequency during a transition time period between the initialization time period and the continuous operation time period, which third pulse frequency corresponds to the first pulse frequency at the beginning of the transition time period and to the second pulse frequency at the end of the transition time period, and can reduce a difference frequency between the third pulse frequency and the second pulse frequency over the transition time period. In particular, the difference frequency can be reduced continuously or gradually and this has the advantages described above for the apparatus.

Against this background, the object of the invention is to provide an improved DC converter and an improved method for operating a DC converter.

Other features which are considered as characteristic for the invention are set forth in the appended claims.

Although the invention is illustrated and described herein as embodied in a resonant DC converter and a method for operating a resonant DC converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
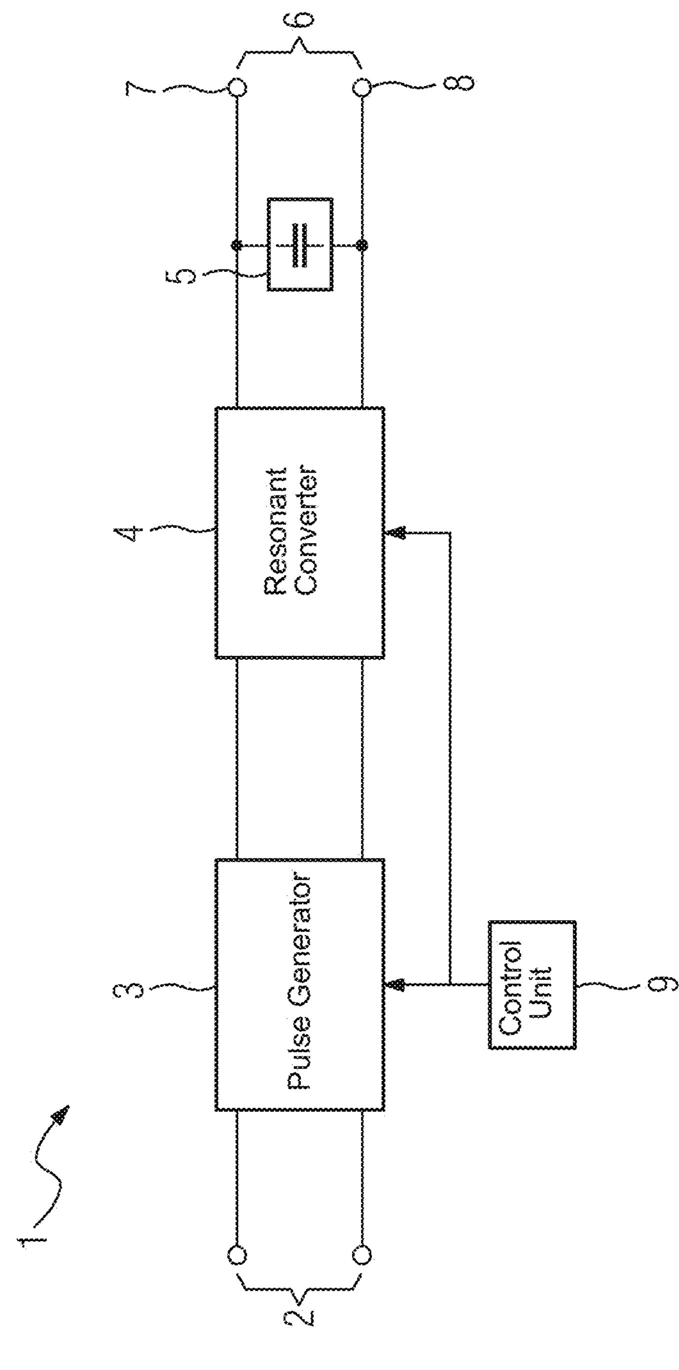
FIG. 1 is a block diagram of a first exemplary embodiment of a DC converter according to the invention.

Referring now to the figures of the drawings in detail and first, particularly to FIG. 1 thereof, there is shown a block diagram of a first exemplary embodiment of the DC converter 1 according to the invention. A pulse generator 3 is connected on the input side to a supply input 2 which is configured in the present case only by way of example as a two-pole input for a DC voltage or a single-phase AC voltage, but could easily also be configured as a multi-phase AC voltage input. The DC converter 1 is provided, via the supply input 2, with the electrical energy which is converted by the DC converter 1 into a DC voltage with a desired voltage value and is output via a DC voltage output 6. If a DC voltage is provided at the supply input 2, the DC converter 1 is a DC//DC converter. If, on the other hand, an AC voltage is provided at the supply input 2, the DC converter 1 is an AC//DC converter.

The pulse generator 3 is provided for the purpose of generating pulses according to a frequency specification of a control unit 9 and outputting them to a resonant converter 4 connected downstream of the pulse generator 3. In the example shown, the resonant converter 4 has a three-phase design (N=3), that is to say it has three resonant tanks which receive pulses from the pulse generator 3 in a manner offset in terms of time with respect to each other. It is also possible to construct the resonant converter 4 with two phases (N=2) or with more than three phases (N>3).

The resonant converter 4 can be constructed according to a known design. In this respect, reference is made here to the known prior art. The outputs of the resonant converter 4 are connected to the DC voltage output 6, between whose positive pole 7 and whose negative pole 8 an output capacitor 5 is connected. The output capacitor 5 is used to filter the DC voltage generated by the resonant converter 4 and to buffer it for possible load fluctuations.

Figure 2:
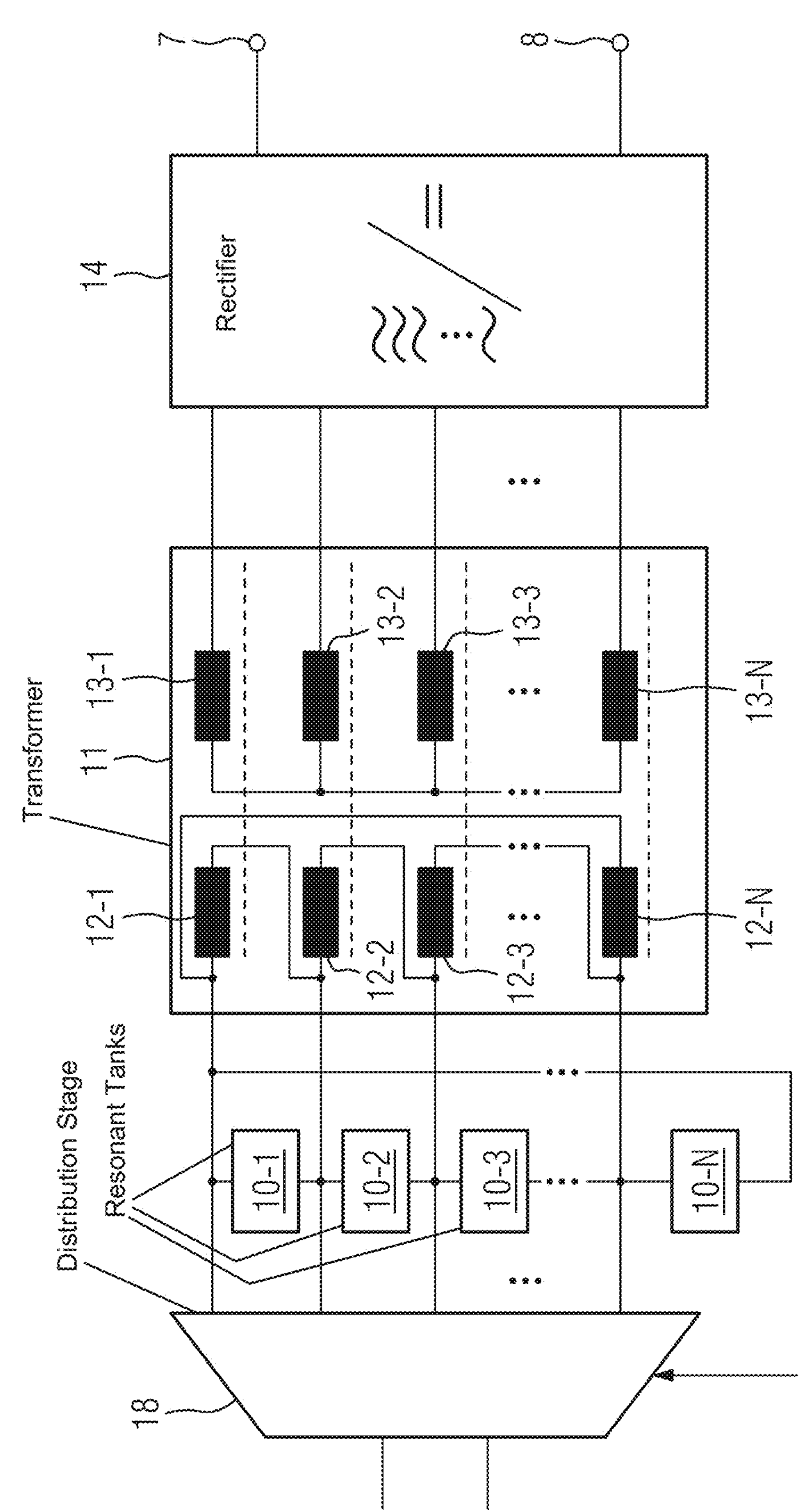
FIG. 2 is a block diagram of an exemplary embodiment of a resonant converter, as can be used in the DC converter according to the invention.

FIG. 2 shows an exemplary embodiment of a resonant converter 4, as can be used in the DC converter 1 according to the invention. In the present case, the resonant converter 4 has an N-phase design, where N is a plurality. Although the N-phase structure is indicated in the figure by four circuit paths, a structure with two, three or more than four phases is also possible. The resonant converter 4 is equipped on the input side with a distribution stage 18, the task of which is to distribute the pulses applied to the inputs of the resonant converter 4 in turn to resonant tanks 10-1, 10-2, 10-3, . . . 10-N which are connected downstream and all have (at least approximately) the same resonant frequency. The distribution stage 18 is preferably controlled by the control unit 9 of the DC converter 1.

By virtue of the fact that the individual resonant tanks 10-1, 10-2, 10-3, . . . , 10-N are excited by pulses offset in terms of time, the resonant tanks 10-1, 10-2, 10-3, . . . , 10-N oscillate with a phase shift with respect to each other. In the case of a three-phase structure of the resonant converter 4, the then three resonant tanks therefore oscillate with an offset of 120 degrees, in the case of a four-phase structure, correspondingly with an offset of 90 degrees, etc. The distribution stage 18 thus reduces the pulse frequency of the pulses generated by the pulse generator 3 for the excitation of the resonant tanks 10-1, 10-2, 10-3, . . . , 10-N by a factor which corresponds to the number N of resonant tanks 10-1, 10-2, 10-3, . . . , 10-N or the number N of phases of the resonant converter 4.

The resonant tanks 10-1, 10-2, 10-3, . . . , 10-N are connected to a corresponding number of primary windings 12-1, 12-2, 12-3, . . . , 12-N of a high-frequency transformer 11, with the result that an alternating current flows in the primary windings 12-1, 12-2, 12-3, . . . , 12-N at a frequency corresponding to the resonant frequency during resonant operation. For this purpose, the resonant tanks 10-1, 10-2, 10-3, . . . , 10-N are connected in parallel with the primary windings 12-1, 12-2, 12-3, . . . , 12-N in the present case. The resonant frequency does not result here solely from the components of the resonant tank but is also influenced by the inductance of the high-frequency transformer 11. The current flowing in the primary windings 12-1, 12-2, 12-3, . . . , 12-N generates a magnetic field which in turn induces voltages in secondary windings 13-1, 13-2, 13-3, . . . , 13-N of the high-frequency transformer 11.

The high-frequency transformer 11 causes electrical isolation and can also cause a voltage transformation, for example in order to generate output voltages that are above the voltage applied to the supply input. However, in some embodiments of the DC converter 1 according to the invention, the high-frequency transformer may have a winding ratio of 1. In general, high-frequency transformers with a configuration different from that shown in FIG. 2 can also be used within the scope of the invention. In FIG. 2, the primary side of the high-frequency transformer 11 is connected in a delta circuit, whereas the secondary side is connected in a star circuit. However, a star circuit could also be used on the primary side and/or a delta circuit could be used on the secondary side. In general, a wide range of high-frequency transformer topologies can be used here.

The voltages induced in the secondary windings 13-1, 13-2, 13 3, . . . , 13-N are output to a rectifier 14 which may be configured as an active or passive rectifier. An active rectifier avoids losses that occur in the diodes used in passive rectifiers by switching transistors on and off instead of the diodes at appropriate times. In addition, it is possible with an active rectifier to design the DC converter to be bidirectional, i.e. to also transport energy from the DC voltage output 6 to the supply input 2. Active rectifiers, however, require additional control effort. In addition, losses again arise due to the gate capacitances of the transistors used in this case, which losses at least partially cancel out the savings from avoiding the power losses of the diodes. If an active rectifier is provided, the transistors can also be controlled by the control unit 9, but appropriate measures should be taken to maintain the electrical isolation (e.g. optocouplers).

Figure 3:
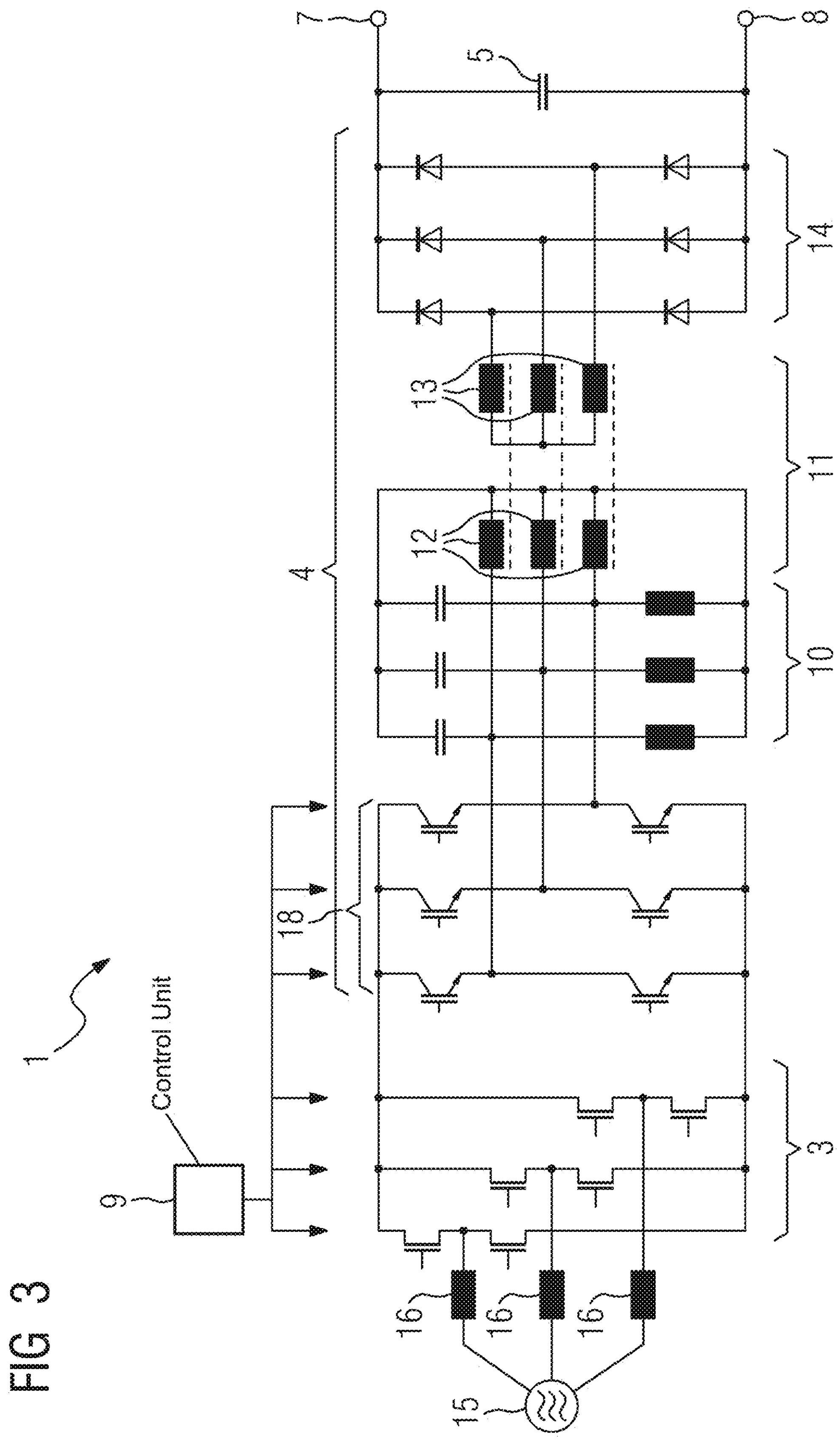
FIG. 3 is a circuit diagram of a second exemplary embodiment of the DC converter according to the invention.

FIG. 3 shows a circuit diagram of a second exemplary embodiment of a DC converter 1 according to the invention. The components belonging to the pulse generator 3, the resonant converter 4 and its main units of distribution stage 18, resonant tanks 10, high-frequency transformer 11 and rectifier 14 are indicated by curly brackets. In the exemplary embodiment in FIG. 3, the supply input (here without a reference sign) is configured for a three-phase AC voltage supply network 15 which is connected to the DC converter 1 via network filter chokes 16. The purpose of the network filter chokes 16 is to dampen a retroactive effect of the connected DC converter 1 on the supply network and to buffer energy for the power consumption of the downstream stages.

The pulse generator 3 has, for each network phase of the AC voltage supply network 15, a half-bridge which is used to connect the network phases of the AC voltage supply network 15 at suitable times in order to generate voltage pulses. Since no intermediate circuit capacitor is provided in the exemplary embodiment shown, that is to say the pulse generator is designed without an intermediate circuit, no DC voltage is established at the interface of the pulse generator 3 and resonant converter 4. The saving of the intermediate circuit capacitor, which is widely used in the prior art, leads to a cost reduction of the DC converter 1, but increases the control requirements when operating the DC converter 1, because the inertia caused by an intermediate circuit capacitor in terms of control is eliminated. Due to the high demands on the edge steepness of the generated pulses and thus on the switching frequency of the switching elements used in the half-bridges, the half-bridges are designed as SiC MOSFETs in the exemplary embodiment in FIG. 3.

A distribution stage 18 of the resonant converter 4 is also constructed from half-bridges in the present case, but these half-bridges advantageously have IGBTs for the reasons explained above. The distribution stage 18 distributes the voltage pulses generated by the pulse generator 3 to the three resonant tanks 10 of the resonant converter 4, such that a pulse appears at each of the resonant tanks 10 on a rotating basis.

Although in the present case the pulse generator 3 is equipped on the input side with three inputs for the three-phase supply voltage and the resonant converter 4 is equipped with three resonant tanks 10, these numbers do not have to be the same. The number of inputs fundamentally depends on the number of connections for the supply voltage, whereas the number of resonant tanks 10 of the resonant converter 4 depends on the number of primary windings 12 of the high-frequency transformer 11.

The basic structure of a resonant converter 4 has already been explained with reference to FIG. 2. FIG. 3 shows a possible circuitry implementation, wherein in the present case the resonant converter 4, in contrast to the example from FIG. 2, has been configured with three phases and the primary side of the high-frequency transformer is connected in a star circuit. The resonant tanks 10 each consist here of a capacitor and a coil, which are connected between a respective input of the resonant converter 4 and a star point. The primary windings 12 of the high-frequency transformer 11 are also connected between the inputs and the star point. However, numerous other circuit configurations are also possible, for example with a delta circuit.

The rectifier 14 is designed in the present case as a passive rectifier. However, as already explained, an active rectifier could also be used.

The output capacitor 5 is designed in the present case as a single capacitor. Here, too, different configurations are possible, for example a series connection of capacitors, in order to allow a higher maximum voltage between the positive pole 7 and the negative pole 8 than would be allowed by the breakdown voltage of a single capacitor. Similarly, circuits with two capacitors and a center tap between the two capacitors can be used as rectifiers 14 and allow a switch between a series connection and a parallel connection of the two capacitors and thus a switch between two modes of operation (single current at double voltage or double current at single voltage).

Figure 4:
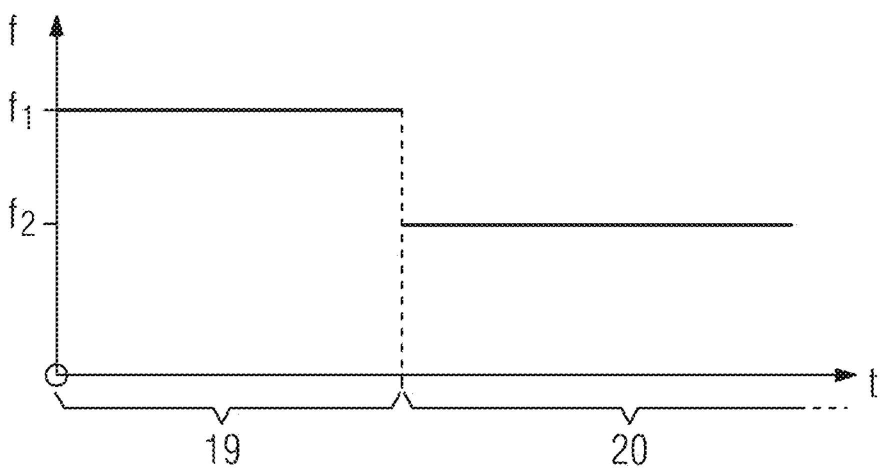
FIG. 4 is a graph showing a first exemplary embodiment of the method according to the invention on the basis of a first diagram in which a pulse frequency f is plotted against time t.

FIG. 4 shows a first exemplary embodiment of the method according to the invention on the basis of a first diagram in which the pulse frequency f is plotted against the time t. A switch-on time at the time t=0 is immediately followed by an initialization time period 19, during which the pulse generator generates pulses at an (increased) frequency f1 according to the first exemplary embodiment of the method according to the invention. Controlling the resonant converter 4 with pulses above its resonant frequency leads to an advantageous reduction in the efficiency of the resonant converter 4 during the initialization time period 19, which leads to the limitation of the inrush currents that is desired according to the invention. Immediately after the initialization time period 19 has elapsed, a continuous operation time period 20 begins, which may last for the entire further operation of the DC converter 1 until it is switched off. During this continuous operation time period 20, the resonant converter 4 is excited with pulses of a pulse frequency f2 which is suitable for the best possible efficiency and is lower than the pulse frequency f1 in the exemplary embodiment in FIG. 4.

Figure 5:
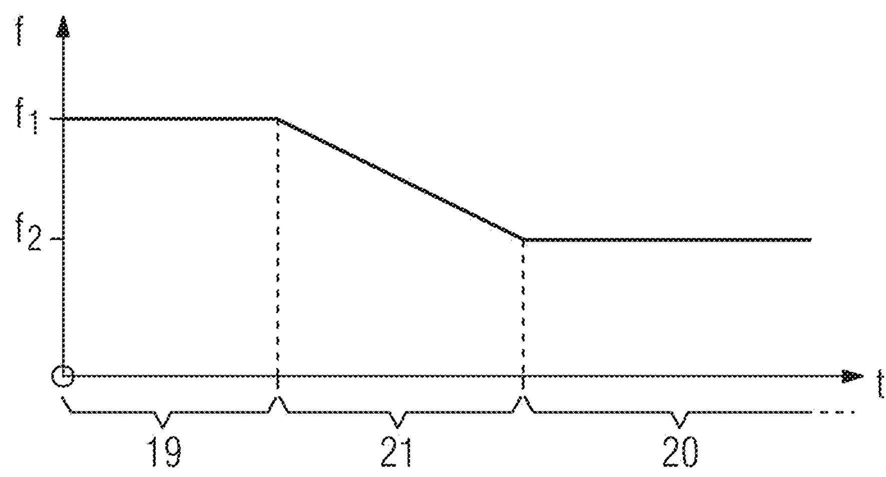
FIG. 5 is a graph showing a second exemplary embodiment of the method according to the invention on the basis of a second diagram in which the pulse frequency f is plotted against the time t.

FIG. 5 shows a second exemplary embodiment of the method according to the invention on the basis of a second diagram in which the pulse frequency f is plotted against the time t. In contrast to the exemplary embodiment in FIG. 4, after the end of the initialization time period 19, the pulse frequency f is continuously approximated here, over a transition time period 21, to the pulse frequency f2 for continuous operation of the DC converter 1, which has the advantages explained above.

Figure 6:
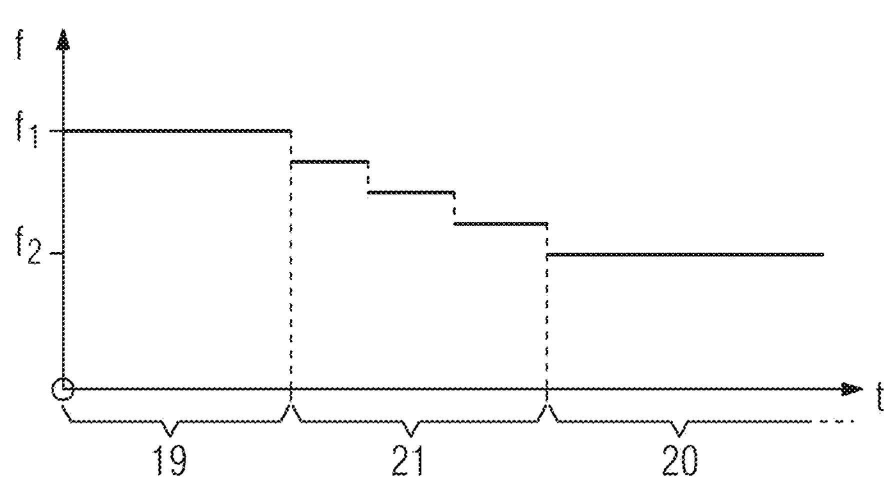
FIG. 6 is a graph showing a third exemplary embodiment of the method according to the invention on the basis of a third diagram in which the pulse frequency f is plotted against the time t.

FIG. 6 shows a third exemplary embodiment of the method according to the invention on the basis of a third diagram in which the pulse frequency f is plotted against the time t. A transition time period 21 is also provided in the third exemplary embodiment of the method according to the invention, but the transition from the initial pulse frequency f1 to the pulse frequency f2 for continuous operation is carried out here in a plurality of steps. This can be easier to implement in terms of control and circuitry than shown in the preceding exemplary embodiment.

The invention was explained in more detail on the basis of representations of exemplary embodiments. However, the invention is not intended to be limited by the exemplary embodiments, but is defined solely by the subsequent patent claims.

The following is a summary list of reference numerals and the corresponding structure used in the above description of the invention:

1 DC converter
2 Supply input
3 Pulse generator
4 Resonant converter
5 Output capacitor
6 DC voltage output
7 Positive pole
8 Negative pole
9 Control unit
10, 10-1, 10-2, 10-3, . . . , 10-N Resonant tank
11 High-frequency transformer
12, 12-1, 12-2, 12-3, . . . , 12-N Primary winding
13, 13-1, 13-2, 13-3, . . . , 13-N Secondary winding
14 Rectifier
15 Supply network
16 Network filter choke
18 Distribution stage
19 Initialization time period
20 Continuous operation time period
21 Transition time period

The invention claimed is:

1. A DC converter, comprising:

a supply input for a supply voltage and having an input side;

a DC voltage output for providing a DC voltage and having a positive pole and a negative pole;

a pulse generator having an input side connected to said supply input and having outputs;

a resonant converter having an output side and an input side, said input side of said resonant converter connected to said outputs of said pulse generator and on said output side said resonant converter connected to said DC voltage output;

an output capacitor connected between said positive pole of said DC voltage output and said negative pole of said DC voltage output;

a controller, wherein said pulse generator is configured to generate pulses at a pulse frequency that can be variably specified by said controller and to output them to said resonant converter;

said resonant converter having a plurality N of resonant tanks with a resonant frequency; and said controller is configured to specify a first pulse frequency to said pulse generator during an initialization time period of the DC converter, and to specify a second pulse frequency different from the first pulse frequency to said pulse generator during a continuous operation time period of the DC converter that follows the initialization time period, wherein the second pulse frequency corresponds to N times the resonant frequency.

2. The DC converter according to claim 1, wherein the first pulse frequency is greater than the second pulse frequency.

3. The DC converter according to claim 1, wherein the first pulse frequency and the second pulse frequency differ by at least 30 percent from each other.

4. The DC converter according to claim 1, wherein the resonant frequency is between 20 and 70 kilohertz.

5. The DC converter according to claim 1, wherein the initialization time period lasts for less than 120 microseconds.

6. The DC converter according to claim 1, wherein the initialization time period lasts for at least 30 microseconds.

7. The DC converter according to claim 1, wherein said controller is configured to:

specify a time-varying third pulse frequency during a transition time period between the initialization time period and the continuous operation time period, wherein the time-varying third pulse frequency corresponds to the first pulse frequency at a beginning of the transition time period and to the second pulse frequency at an end of the transition time period; and reduce a difference frequency between the time-varying third pulse frequency and the second pulse frequency over the transition time period.

8. The DC converter according to claim 1, wherein said pulse generator has SiC metal-oxide-semiconductor field-effect transistors or GaN transistors.

9. The DC converter according to claim 1, wherein said resonant converter has insulated-gate bipolar transistors.

10. The DC converter according to claim 1, wherein said pulse generator is configured without an intermediate circuit.

11. The DC converter according to claim 1, wherein said resonant converter has an N-phase high-frequency transformer having N primary windings which are each connected to a respective one of said N resonant tanks.

12. A method for operating a DC converter having a supply input for a supply voltage, a DC voltage output for providing a DC voltage, a pulse generator connected on an input side to the supply input, a resonant converter connected on an input side to outputs of the pulse generator and on an output side to the DC voltage output, and an output capacitor connected between a positive pole of the DC voltage output and a negative pole of the DC voltage output, wherein the pulse generator is configured to generate pulses at a variable pulse frequency and to output them to the resonant converter, wherein the resonant converter has a plurality N of resonant tanks having a resonant frequency, which comprises the steps of:

generating, via the pulse generator, the pulses at a first pulse frequency during an initialization time period of the DC converter and generating the pulses at a second pulse frequency different from the first pulse frequency during a continuous operation time period of the DC converter that follows the initialization time period, wherein the second pulse frequency corresponds to N times the resonant frequency.

13. The method according to claim 12, which further comprises setting the first pulse frequency to be greater than the second pulse frequency.

14. The method according to claim 12, wherein the first pulse frequency and the second pulse frequency differ by at least 30 percent from each other.

15. The method according to claim 12, wherein the pulse generator:

generates pulses at a time-varying third pulse frequency during a transition time period between the initialization time period and the continuous operation time period, the time-varying third pulse frequency corresponding to the first pulse frequency at the beginning of the transition time period and to the second pulse frequency at the end of the transition time period; and reduces a difference frequency between the time-varying third pulse frequency and the second pulse frequency over the transition time period.

* * * * *